United States Patent [19]

Jackson et al.

[11] Patent Number: 5,730,462
[45] Date of Patent: Mar. 24, 1998

[54] SHRINK WRAP GENERANT CARTRIDGE

[75] Inventors: Scott A. Jackson, Centerville; Donald J. Cunningham, North Ogden, both of Utah

[73] Assignee: Morton International, Inc., Chicago, Ill.

[21] Appl. No.: 550,725

[22] Filed: Oct. 31, 1995

[51] Int. Cl.$^6$ ........................... B60R 21/28
[52] U.S. Cl. ........................... 280/741; 102/530
[58] Field of Search ................... 280/741, 736; 102/530, 531

[56] References Cited

U.S. PATENT DOCUMENTS

| | | | |
|---|---|---|---|
| 4,005,876 | 2/1977 | Jorgensen et al. | 280/741 |
| 4,158,696 | 6/1979 | Wilhelm | 280/736 |
| 4,370,930 | 2/1983 | Strasser et al. | 280/741 |
| 4,414,902 | 11/1983 | Strasser et al. | 280/741 |
| 4,919,897 | 4/1990 | Bender et al. | 280/736 |
| 4,952,341 | 8/1990 | Sayles | 102/289 |
| 5,468,016 | 11/1995 | Kobari et al. | 280/741 |
| 5,483,896 | 1/1996 | Hock et al. | 280/741 |

Primary Examiner—Paul N. Dickson
Attorney, Agent, or Firm—Lawrence L. Field; Gerald K. White

[57] ABSTRACT

A generant cartridge for incorporation into an airbag inflation module, is produced by shrink wrapping a plastic envelope around gas generant pellets or wafers thereby completely encapsulating the gas generant in a hermetically sealed envelope. The gas generant cartridge may be prepared at one location and brought to an assembly line located at another location. As a result, the assembly of the generant into the module inflator is simplified. The gas generant may be shrink wrapped with an entire filter assembly or with only a portion of the filter assembly and then inserted into an inflator. A booster charge for rapid ignition of the gas generant may also be inserted in the cartridge.

6 Claims, 2 Drawing Sheets

5,730,462

SHRINK WRAP GENERANT CARTRIDGE

This invention relates to an improvement in one component in an airbag inflation module, namely the gas generant. More particularly, it relates to hermetically sealing the gas generant within a film of synthetic resin polymer shrunk completely around the generant as a wrapping protecting the generant from moisture and any other potentially reactive constituents in the atmosphere to which it is exposed prior to being assembled into the module.

BACKGROUND OF THE INVENTION

Airbag modules are manufactured by assembling a large number of components. Many components, especially those of metal or synthetic plastics are affected very little by the environment to which they are exposed while awaiting incorporation into the module or into a subassembly. Others, particularly chemicals such as those used to generate gases which inflate the airbag when it is being deployed, are susceptible to undesired reactions with one or more components of the atmosphere such as moisture or oxidizing gases.

In order to simplify the assembly of an airbag inflation device and to lessen the dangers due to deterioration as a result of unwanted reactions, the generant is brought to the module at the latest possible point in an assembly line. Nevertheless, the possibility that a dangerous reaction may occur is always present, especially when handling wafers or pellets of the gas generating materials. Consequently there is a need to minimize these dangers.

The present invention addresses this problem with particular regard to the generant used as a source of inflation gas for inflating a cushion or airbag.

Inflators to which the present invention is related include those described in the following U.S. Pat. Nos.:

| Schneiter et al | 3,985,076 | issued | Oct. 12, 1976 |
| Wilhelm | 4,158,696 | issued | June 19, 1979 |
| Bender et al | 4,919,897 | issued | April 24, 1990 |
| Hock | 5,398,966 | issued | March 21, 1995 |
| Cunningham et al | 5,409,259 | issued | April 25, 1995 |

The disclosures of these patents are incorporated by this reference.

In Schneiter et al (U.S. Pat. No. 3,985,076) the gas generant is enclosed in an aluminum container which is sealed with a double crimp seal.

In Wilhelm (U.S. Pat. No. 4,158,696) the gas generant wafers and a propellant powder are enclosed in a hermetically sealed cartridge made of a frangible material such as a polyamide film or a phenolic impregnated paper tube. In Wilhelm there is no mention of shrink wrapping.

In Bender et al (U.S. Pat. No. 4,919,897) the gas generant is positioned within a shrunk on sleeve, but the sleeve does not enclose the ends of the generant and the ignition system is not positioned within the generant wafers. In Bender et al, no mention is made of providing a hermetic seal.

In Hock (U.S. Pat. No. 5,398,966) the gas generant is enclosed within a filter pack, the outer wall of which is covered by a barrier foil.

In Cunningham et al (U.S. Pat. No. 5,409,259) the gas generant is enclosed in a tubular sheet of aluminum sealed at its seams by a hot melt adhesive and at its ends by end caps of aluminum sheet.

Of the above, only the Bender et al patent discloses an inflator for air bags in which the gas producing material is encased in a shrunk on plastic sleeve. The present invention differs from the Bender patent in several respects. In Bender the wafers are not completely enclosed by shrunk on sleeve 13. In the present invention, the shrunk-on plastic film with endcaps completely encapsulates the gas generant providing a hermetic seal.

THE INVENTION

The shrink wrap film of this invention replaces the aluminum foil currently bonded to the inflator chamber wall to create the necessary hermetic seal. The benefits of a cartridge such as the one described are principally with regard to the inflator manufacturing and assembly process. The cartridge concept allows the generant to be loaded off-line, reducing cycle time. Additionally, if the cartridges were to be loaded on location where the generant is produced, scrap costs due to broken wafers and pellets during shipping can be decreased. Finally, by creating a hermetically sealed cartridge to house the generant, the foil currently being bonded to the inflator chamber wall is no longer necessary and that station can be removed from the inflator line further reducing cycle time.

The heat shrink cartridge of this invention is an improvement over the prior art. By using endcaps with adhesive, a seal can be formed around the generant independent of the inflator configuration. The endcaps serve two functions. The first is to provide a hermetic seal, and the second is to separate the shrinkwrap material from the filter secreens to prevent abrasion and possible damage and to provide a plenum to aid in dispersion of the shrinkwrap material and allow a flow path for exiting gas. The endcaps have a thinner section in the center or a hole with a thin disk coveting it through which the initiator charge breaks to ignite the booster charge and gas generant. Because these cartridges are sealed and have no internal ignition device, they may be handled as separate components from the inflator and stored until needed for inflator builds. The shrink wrap is also versatile enough to accommodate wafers or pellets.

OBJECTS

One object of the invention is to encase generant tablets or wafers in a sealed wrap to form a cartridge that can be preloaded off-line and then dropped into an inflator housing at or close to final assembly.

Another object of the invention is to provide a means for assembling the generant in an airbag module with other elements physically associated with the generant in a form which permits their assembly into an inflator for an airbag module in a simple, low cost and effective manner.

Still another object of the invention is to provide a means with great flexibility as to size (i.e. length and diameter) and as to the mount of generant being loaded into an inflator.

A further object of the invention is increase the effectiveness of the assembly line process in which airbag modules are manufactured.

DESCRIPTION OF THE DRAWINGS

These and other objects will be pointed out or will become apparent in the description which follows taken with the drawings in which:

FIGS. 1 and 2 show gas generant wafers 12 having a centrally located bore 16 which may be circular as shown in FIG. 2 or polygonal or any other suitable shape. Instead of wafers, the gas generant may be in the form of pellets.

FIGS. 3 and 4 are views showing the wafers 12 completely enclosed in a plastic film 14 applied to encase the wafers and shrunk onto the wafers by application of heat to form a gas generant cartridge 10.

FIG. 5 shows a passenger side gas generant cartridge assembly 10 which includes gas generant wafers or pellets 12 which are usually round in shape and which may have either flat or embossed faces and a film 14 of synthetic resin polymer applied by a shrink wrapping process which completely encapsulates and hermetically seals the generant in the wrap. The ends of the cartridge are hermetically sealed by adhesive lined end caps 18 in which there is a ruptureable foil disc or thin material 18a and which form a hermetic seal with the shrink wrap film. The end caps may be either synthetic polymer or rubber. A bore 30 in the shrink wrapped assembly of FIG. 5 is configured to receive an igniter booster charge 28 either loose or encased in a tube. A ruptureable disc 32 may also be placed within the wafer stack to concentrate the booster charge near the initiator. The shrink wrap encloses the outside, and the ends of the cartridge. FIGS. 6 and 7 are similar views of a driver side gas generant cartridge assembly 10.

Referring to FIG. 8, the cartridge assembly is made by loading the generant (wafers or pellets) 12 into a tube 20 of a polymer; and then applying heat to shrink the tubing down around the contents. As shown in FIGS. 5 and 9 end caps 18 can be added by pressing them onto the formed cartridge, producing a hermetic seal. These endcaps 18 have a larger outer diameter than the shrink wrapped cartridge to protect the material from abrasion or tearing when inserted into a filter pack. The resulting cartridge is then dropped into an inflator chamber inside of the rest of a filter pack, e.g. as described in the above noted patents.

FIG. 9 shows an assembled cartridge ready to be loaded into an inflator. FIG. 10 is an end view of FIG. 9.

It is also possible to practice the invention using small pellets of gas generant instead of the wafers shown in the previous figures.

Figure 5:
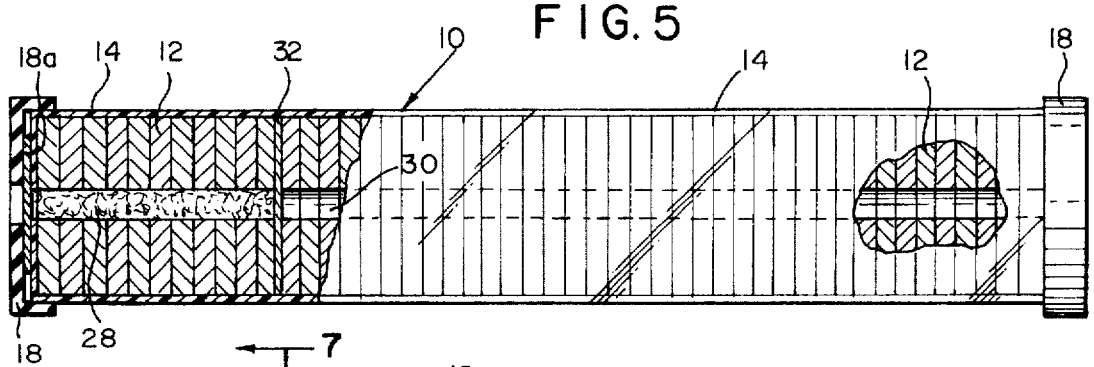
FIG. 5 is a view partly in section of a gas generant cartridge for a passenger side airbag inflator.
Figure 6:
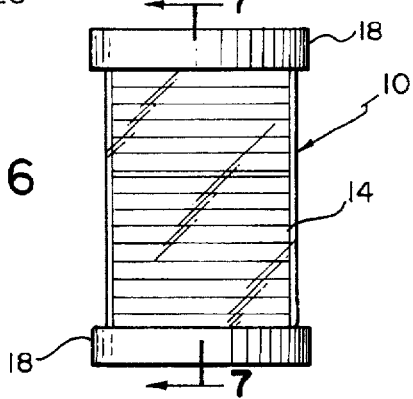
FIG. 6 is a view of a cartridge for a driver side airbag inflator.
Figure 7:
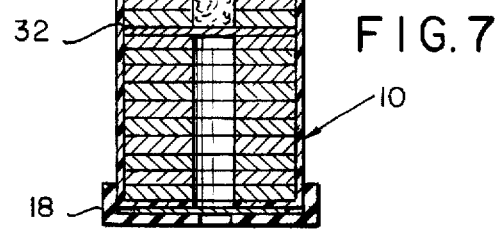
FIG. 7 is a section on plane 7—7 of FIG. 6.
Figure 8:
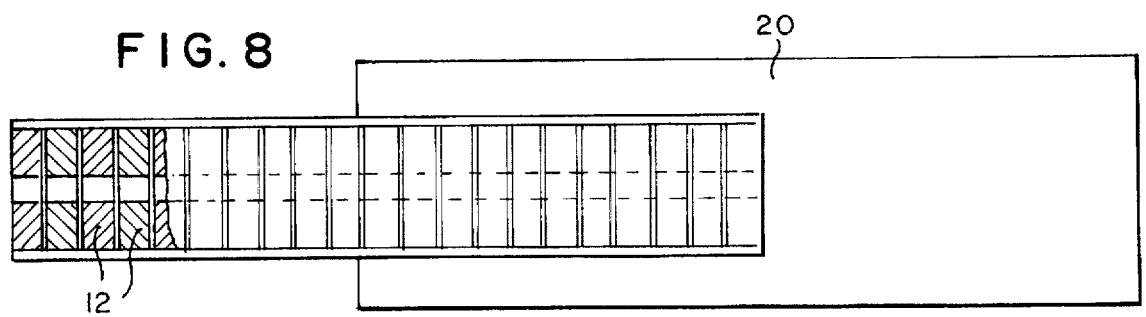
FIG. 8 is a view showing the assembling of a tube of shrinkable polymer around gas generant wafers.
Figure 9:
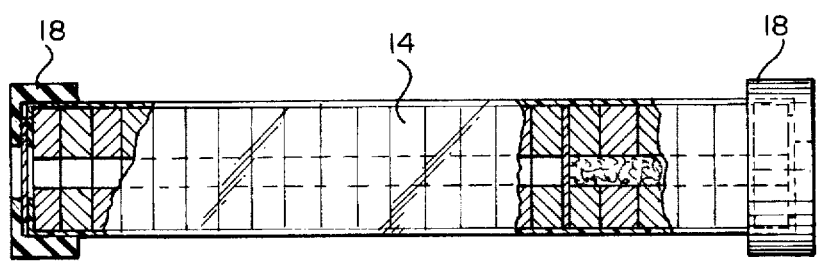
FIG. 9 is a view showing additional elements added to the cartridge.
Figure 10:
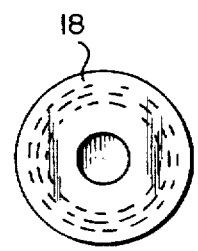
FIG. 10 is an end view of the completed cartridge of FIG. 9.
Figure 11:
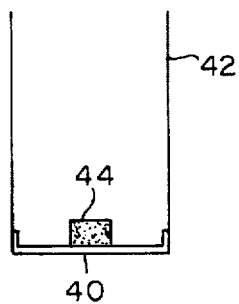
FIGS. 11-15 are views schematically showing the preparation of a package using pellets instead of wafers and FIG. 16 is a view showing a modified endcap.
Figure 12:
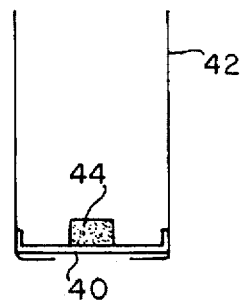
Figure 13:
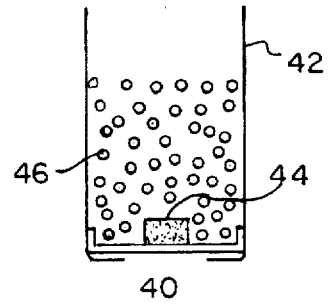
Figure 14:
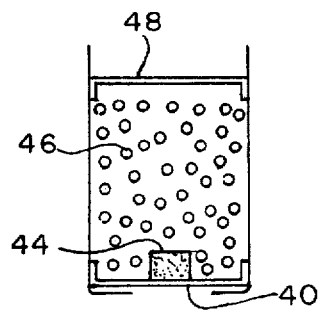
Figure 15:
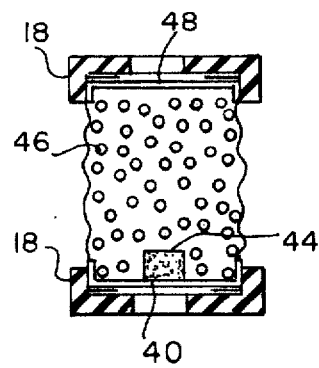

FIGS. 11-15 show a sequence of steps for preparing a cartridge of shrink wrapped gas generant pellets. For example a cap 40 may be inserted into one end of a tube 42 of a shrink wrap material. The cap then gives shape to the tube 42. The cap 40 may have a packet for a booster charge 44. Tube 42 is shank onto cap 40 and then is filled with the desired amount of pellets 46 of gas generant. Then a second cap 48 is inserted in the tube 40 and the tube is shrunk around the cap to form an enclosed generant cartridge like that shown in FIG. 5. The rubber end caps help hold the disc, cushion the generant stack and provide a plenum between the generant stack and the outer screens.

Figure 16:

FIG. 16 shows a modified end cap having a thinned central area 48 which is readily ruptured.

The encapsulation of the gas generant in a shrunk on polymer film allows the generant to be loaded off-line independent of the main inflator assembly line and then dropped into the inflator in a single motion, thereby reducing cycle time and down time on the inflator line. The shrunk-on plastic wrap is lighter than and less expensive than the aluminum wrap shown in prior patents and is easier to apply. The film is preferably a polyolefin but other heat shrinkable polymers may be used.

Figure 1:
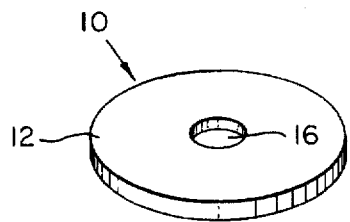
FIG. 1 is a view in perspective of a gas generant wafer.
Figure 2:
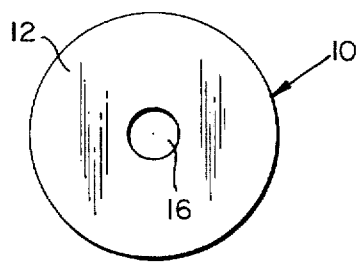
FIG. 2 is a top plan view of the wafer of FIG. 1.
Figure 3:
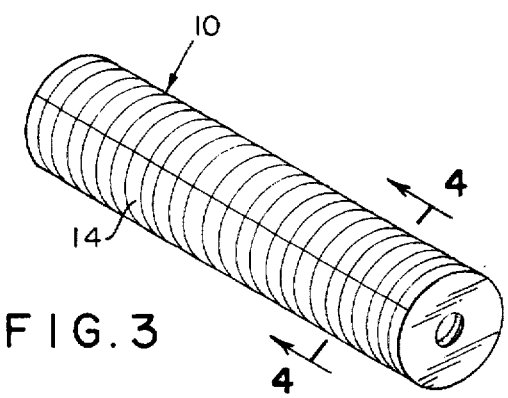
FIG. 3 is a view of a package of wafers sealed in a wrapping shrunk around the wafers for a passenger side airbag inflator.
Figure 4:
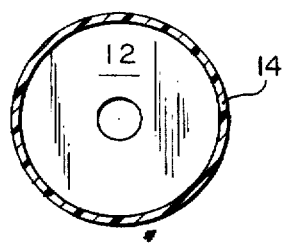
FIG. 4 is a section on plane 4—4 of FIG. 3.

While it is possible to wrap a cartridge including an entire filter assembly within the shrink wrap or only a portion of the filter assembly within the wrap, it is also possible to merely wrap the gas generant as shown in FIGS. 3 and 4 and to dispose the filter assembly or any portion of the filter outside of the shrink wrapped gas generant cartridge package.

It will be seen that this invention provides a simpler and less expensive method of preassembling the generant in a form which is readily inserted into an inflator housing, than the methods of the prior art.

Having now described the invention, it is not intended that it be limited except as required by the appended claims:

We claim:

1. In assembling an airbag inflator, a process comprising the steps of providing a tube of a shrink wrap synthetic resin polymer material; inserting a cap into one end of said tube; inserting at least a portion of a filter assembly within said tube filling said tube with gas generant pellets or wafers; and then hermetically sealing said inflation gas generant wafers or pellets in said tube of synthetic resin polymer by shrink wrapping said film of said polymer completely around said filter and said generant wafers or pellets and adding end caps to the shrunk wrapped product.

2. In assembling an airbag inflator, the process of claim 1 followed by inserting the shrink wrapped generant wafers or pellets into an inflator housing.

3. A gas generant cartridge for an airbag cushion inflation device comprising gas generant wafers or pellets and a shrink wrapped film completely enclosing said gas generant wafers or pellets to form a cartridge whereby said gas generant wafers or pellets may be assembled into an airbag inflator, said cartridge including at least a portion of a filter screen system disposed between said gas generant wafers or pellets and said shrink wrapped film, said cartridge having a body and ends.

4. The cartridge of claim 3 including in addition end caps attached to the ends of said cartridge.

5. The cartridge of claim 3 wherein said gas generant wafers have a bore and said cartridge has a bore extending axially of the cartridge.

6. The cartridge of claim 5 including in addition an igniter booster charge for said gas generant, said igniter booster charge being positioned in said axially extending bore.

* * * * *